United States Patent [19]

Bleasdale et al.

[11] Patent Number: 4,586,287

[45] Date of Patent: May 6, 1986

[54] VEHICLE-BORNE APPARATUS FOR SPRAYING AROUND IMMOVABLE OBJECTS

[75] Inventors: William W. Bleasdale; Frank E. Boultbee, both of Penticton, Canada

[73] Assignee: Okanagan Turbo Sprayers Ltd., Canada

[21] Appl. No.: 627,064

[22] Filed: Jul. 2, 1984

[51] Int. Cl.[4] .......................... A01G 25/09; B05B 3/12
[52] U.S. Cl. ...................................... 47/1.7; 239/166; 239/172; 239/288.5
[58] Field of Search ................ 239/159, 163, 164, 166, 239/172, 288–288.5; 47/1.5, 1.7, DIG. 4

[56] References Cited

U.S. PATENT DOCUMENTS

| | | | |
|---|---|---|---|
| 3,127,109 | 3/1964 | Frase | 239/172 |
| 4,288,034 | 9/1981 | Widmer et al. | 239/159 |
| 4,291,492 | 9/1981 | Reynolds et al. | 47/1.7 |

FOREIGN PATENT DOCUMENTS 493523  12/1976  Australia ................. 47/1.7

Primary Examiner—Johnny D. Cherry
Attorney, Agent, or Firm—Kane, Dalsimer, Kane, Sullivan and Kurucz

[57] ABSTRACT

Vehicle-borne apparatus for spraying liquid completely around immoveable upstanding objects such as trees or poles. The apparatus comprises an articulated boom having a pair of normally aligned, linear members. These members are secured to each other so that during operation the outer member can pivot out of alignment about a vertical axis in a direction opposite to the direction of motion, against the force of a biasing spring urging that member back to aligned position. A spray head is rotatably secured to the front end of the outer member, to rotate about a vertical axis at the center of the head. The head has a plurality of arms with spray nozzles at their ends, radially and outwardly extending from its center. Adjacent arms form angles of 90° or more with respect to each other and receive between them a portion of the immoveable object. This device is particularly useful for herbicidal spraying of a line of trees, as in an orchard, enabling spraying completely around the base of such trees from a single pass of a tractor carrying the apparatus along one side of such a row of trees.

8 Claims, 15 Drawing Figures

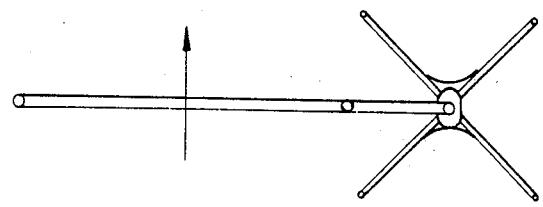
FIG. 4e
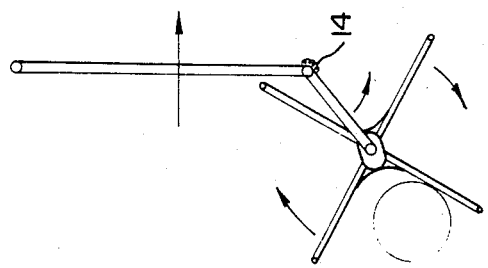
FIG. 4d
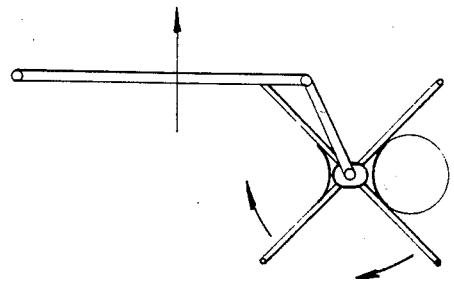
FIG. 4c
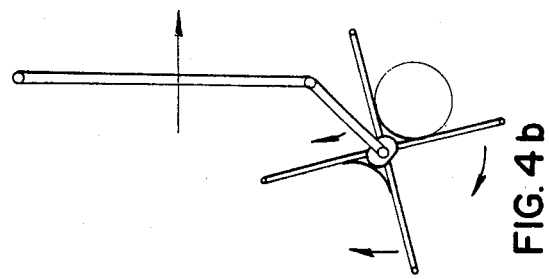
FIG. 4b
FIG. 5
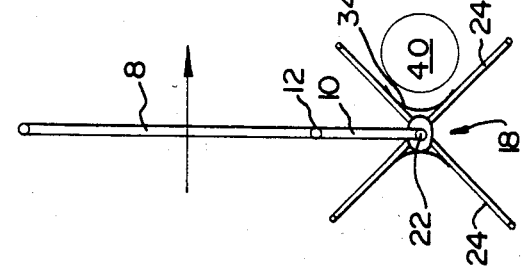
FIG. 4a

VEHICLE-BORNE APPARATUS FOR SPRAYING AROUND IMMOVABLE OBJECTS

BACKGROUND OF THE INVENTION

The present invention relates to an apparatus to be borne by a tractor or similar vehicle for spraying liquids such as herbicides completely around upstanding immoveable objects such as trees in an orchard, poles or the like, from one side thereof.

When spraying herbicides in orchards, to kill weeds and other noxious plants at the bottoms of the orchard trees, it is known to spray the herbicide from spray jets mounted at the end of a boom carried by a tractor or the like. The tractor normally passes along one side of a row of trees while spraying, and back along the other, to ensure that herbicide has been sprayed completely about the bases of the trees. Such apparatus may be provided with a control switch by which the operator can manually commence or terminate the spraying of herbicide since, for example, herbicide may not be required between the trees but only at their bases. Care must be taken, when using such spray apparatus, that the boom and spray nozzles are not carried too close to the trees, since the booms and spray nozzles may be damaged if they come into contact with the trunks of the trees.

PRIOR ART

Prior art references of interest, describing boom devices for agricultural spraying include U.S. Pat. Nos. 3,127,109 of Frase issued Mar. 31, 1964; 3,545,678 of Tangeman issued Dec. 8, 1970; and 4,197,999 of Lammeurs issued Apr. 15, 1980, as well as Canadian Pat. Nos. 779,839 of Butler issued Mar. 5, 1968; 797,655 of Funk et al issued Oct. 29, 1968; and 1,125,025 of Hardy et al issued June 8, 1982. Several of these patents describe booms which are articulated to permit swinging of the boom in a horizontal plane (eg. Lammeurs U.S. Pat. No. 4,197,999, Tangeman U.S. Pat. No. 3,545,678).

Fieber U.S. Pat. No. 2,770,493 issued Nov. 13, 1956 describes and illustrates a spray boom for spraying crops, the boom being pivotable about both horizontal and vertical axes. The boom is provided with a suspension which enables the boom to pivot vertically or angularly upward when it encounters an obstacle, thereby enabling the boom to clear that obstacle. Similarly, Hodges Canadian Pat. No. 539,664 issued Apr. 18, 1957 describes and illustrates a boom type crop spraying apparatus having a pair of side booms which are hinged in a manner such that in operation, the booms may break fore or aft permitting the tractor carrying the booms to be halted before damage is done to the booms. Springs return the booms to normal position once the obstruction is removed.

It is an object of the present invention to provide a vehicle-borne spraying apparatus which will permit complete spraying around the bases of trees and the like from one side thereof. It is a further object of the invention, in one embodiment thereof, to provide such a device which will automatically commence the spraying operation to enable spraying around the base of a tree or the like and automatically terminate that operation when completed.

SUMMARY OF THE INVENTION

According to the present invention there is provided an apparatus to be borne by a tractor, truck or similar vehicle for spraying liquid completely around immoveable upstanding objects such as trees or poles. The apparatus comprises an articulated boom made up of a pair of inner and outer, normally aligned, linear members, the inner member to be secured to the tractor to extend outwardly from a side thereof. These members are secured to each other at one end so that during operation the outer member can pivot out of alignment with respect to the inner member, in a horizontal plane about a vertical axis in a direction opposite to the direction of motion of the tractor. A biasing means such as a spring urges the outer member back to aligned position when it pivots out of alignment. A spray head is rotatably secured to the free end of the outer member, to rotate about a vertical axis at the center of the head. The head has a plurality of arms radially and outwardly extending from its center. Adjacent arms form angles of about 90° or more with respect to each other. These arms receive between them a portion of the immoveable object. A spray nozzle is mounted at the end of each of the arms. Liquid to be sprayed is piped to the spray nozzles by appropriate means. In operation, the boom is moved so that a portion of the immoveable object is received between adjacent arms of the spray head, as the apparatus is moved in one direction to one side of the object. This causes the outer boom member to pivot rearwardly and draw the spray head by the object in close proximity thereto, the spray head being thereby rotated in such a manner that spray from the spray nozzles covers the ground all around the base of the object.

In a preferred embodiment of the present invention, a cam means is provided between adjacent arms of the spray head to provide a surface against which the portion of the object received can bear and facilitate rotation of the spray head. The cam means may take the form of a curved plate which extends between adjacent pairs of arms near their inner ends. The plate may be pivotably secured to one of the arms, and a switch means operatively positioned behind the plate and associated with the means to carry liquid to be sprayed to the spray nozzles, so that when the plate is pivoted while the immoveable object is in contact with it, the switch is acutated to permit flow of spray from the spray nozzles, and when the object is no longer in contact with the plate, the plate returns to unpivoted position deactivating the switch and stopping the flow of spray.

The tractor-borne spring apparatus according to the present invention is particularly useful for herbicidal spraying of a line of trees, an in an orchard, enabling spraying completely around the base of such trees from a single pass of a tractor carrying the apparatus on one side of such a row of trees. In addition, when a pivoting cam means is used in conjunction with a switch to activate the spraying when an object is received between the arms and bumps against the curved plate (the switch being deactivated when the object ceases its bearing against that plate as the apparatus leaves the object's vicinity), it will be appreciated that automatic means of controlling the spraying apparatus is provided, with consequent savings in herbicide or other liquid being sprayed.

BRIEF DESCRIPTION OF THE DRAWINGS

These and other objects and advantages of the invention will become apparent upon reading the following detailed description and upon referring to the drawings in which:

FIGS. 4a, 4b, 4c, 4d and 4e, are schematic plan views of the apparatus of FIG. 1 in various phases of its operation;

FIG. 5 is a plan view of a ground pattern of spraying achieved by the device of FIG. 1.

Figure 3:
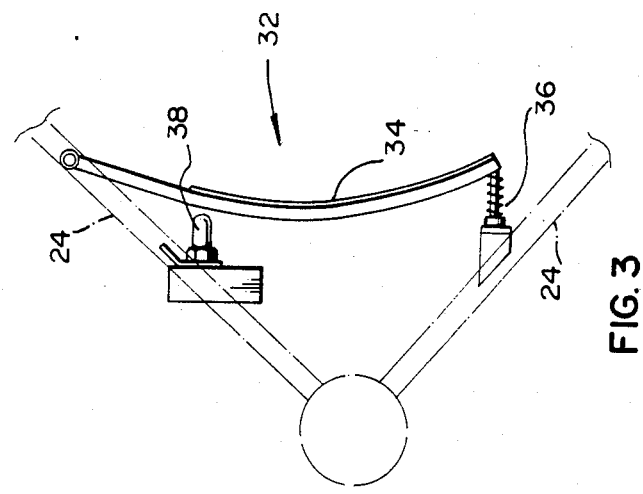
FIG. 3 is an enlarged plan view of the cam means and switch mechanism according to one embodiment of the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 1:
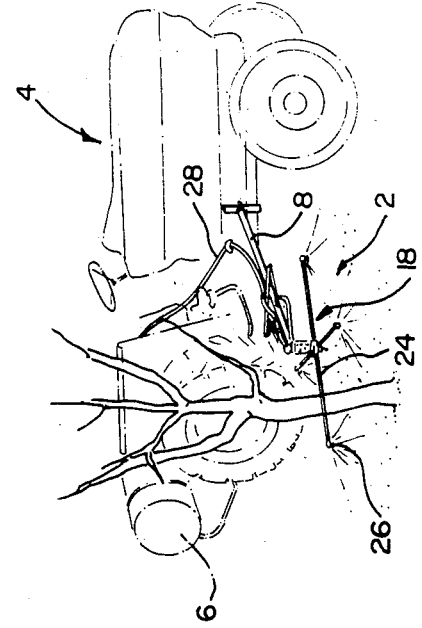
FIG. 1 is a perspective view of a spraying apparatus according to the present invention, borne by a tractor.
Figure 2:
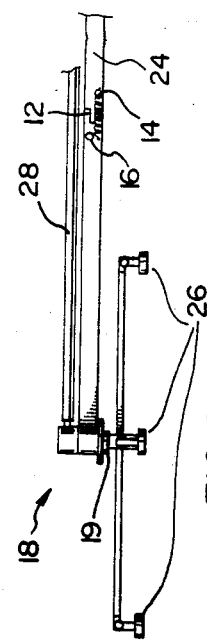
FIG. 2 is a partial side view of the apparatus of FIG. 1.

Turning to FIGS. 1 and 2 there are shown respectively a perspective view and a partial side view of a tractor-borne apparatus 2 for spraying around immoveable upstanding objects of generally circular cross-section, such as tree trunks and poles, according to the present invention. Apparatus 2 is carried by a tractor 4 or any other suitable vehicle. The vehicle also supports and carries a reservoir 6 for the liquid to be sprayed. The apparatus of the present invention is intended primarily for spraying of liquid herbicide. But it may obviously also be used for spraying of other liquid or liquid-like substances such as, for example, liquid fertilizers.

The apparatus comprises inner boom member 8 and outer boom member 10, which are pivotally hinged at their ends at pivot point 12 to provide an articulated boom. Inner member 8 is suitably secured to tractor 4, as illustrated (FIG. 1), to extend outwardly from its side. Spring 14 co-acts with members 8 and 10 to urge the members towards aligned position as illustrated in FIGS. 1 and 2, stop 16 preventing them from going beyond that position in the forward (relative to the normal direction of motion of the boom during operation) direction. To the end of outer boom member 10 is rotatably secured a spray head 18. This spray head may be detachable, for example, using an appropriate coupler 19 (FIG. 2) matably received in an appropriate socket (not shown) in the free end of outer boom member 10. Spray head 18 normally rotates in a vertical plane about pivot point 22. Head 18 comprises a plurality of hollow arms 24 radially and outwardly extending from pivot point 22. In the embodiment illustrated in FIGS. 1 and 2, the head has four such arms 24 of similar length, equally spaced at 90° angles to each other. The length of these arms is determined by the intended application of the apparatus. They would normally be of a length greater than the diameter of the pole or tree trunk about the base of which spray is to be applied, to provide for even and proper application of the spray.

At the ends of each of the arms 24 are secured spray nozzles 26, the nozzles being preferably adjustable to pivot about a horizontal axis so that they may be appropriately aimed depending on the particular application desired. To feed liquid from reservoir 6 to the spray nozzles 26 an appropriate liquid piping means comprising hose 28 is provided. Hose 28 delivers the liquid to the center of spray head 18 where it is fed through arms 24 to the spray nozzles 26. This of course requires an appropriate liquid passageway extending through coupler 19 and hollow arms 24.

To assist the rotation of spray head 18, as will be described in more detail hereinafter, during operation, a cam 32 (e.g. FIGS. 3, 4a) may be provided. This cam consists of a bumper plate 34 extending between adjacent arms 24 at their base, and concavely curved between these arms to receive the immoveable object, such as a tree trunk.

In operation, as illustrated in the series of schematic plan views of FIGS. 4a, 4b, 4c, 4d and 4e, the boom made up of members 8 and 10 is carried in the direction shown and approaches an object 40 (eg. the trunk of a tree), the boom being positioned so that object 40 will be generally received between a pair of arms 24 between which a bumper plate 34 is positioned (FIG. 4a). As the apparatus 2 is carried in this same direction, the force of object 40 acting against plate 34 and spray head 18 causes member 10 to be pivoted about pivot point 12 rearwardly (FIG. 4b). Continued forward motion of apparatus 2 (FIGS. 4c and 4d) results in object 40 bearing against arms 24 and plate 34 in a manner which causes the illustrated rotation of spray head 18 as well as its non-linear horizontal movement about the surface of object 40. As the apparatus passes object 40 (FIG. 4d) object 40 ceases to bear against plate 34 and one or other of arms 24 and spring 14 causes boom member 10 to return to its aligned position with respect to boom member 8 (FIG. 4e). Any appropriate manual or mechanical mechanism to start and stop and otherwise control the flow of spray from the apparatus may be used, including the switch mechanism of FIG. 3 which will be described in more detail hereinafter.

A constant spray from apparatus 2, not interrupted between objects 40 will give a spray pattern on the ground similar to that illustrated in FIG. 5.

Figure 6A:
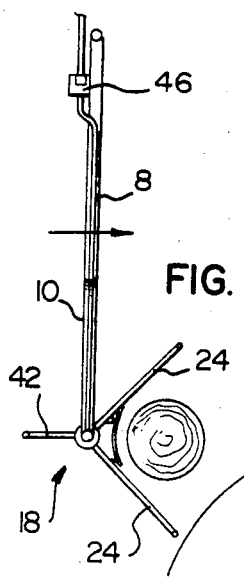
FIGS. 6a, 6b, 6c, 6d, 6e and 6f are schematic plan views of a further embodiment of apparatus according to the present invention in various phases of its operation.
Figure 6B:
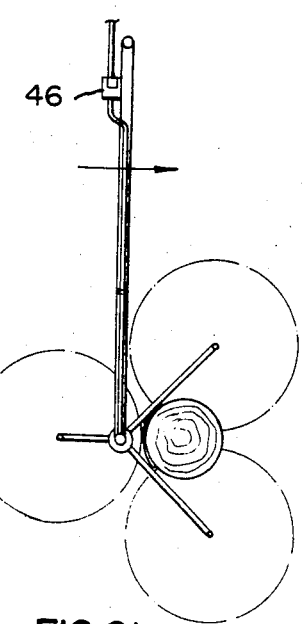
Figure 6C:
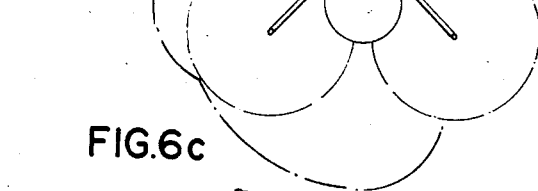
Figure 6D:
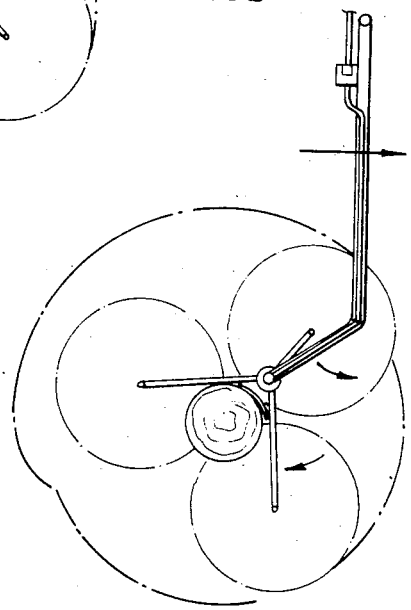
Figure 6E:
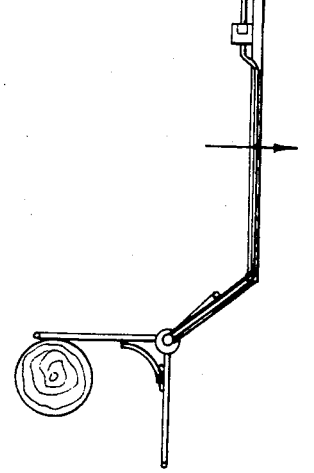
Figure 6F:
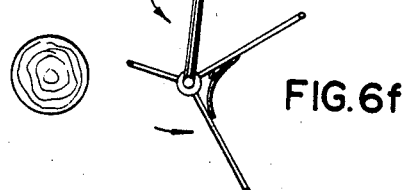

In an alternative embodiment of the apparatus 2 according to the present invention, as illustrated in FIGS. 6a to 6f, spray head 18 is provided with three instead of four arms, two of these arms 24 being of regular length and positioned at a 90° angle to each other in the horizontal plane. The third arm 42 however is of shorter length and positioned at a 135° angle to each of the normal arms 24. As well, in this embodiment, bumper plate 34 is shown to be pivotally secured to one of the arms 24 (FIG. 3), and its motion controlled by bumper guide 36. Behind bumper plate 34 is a bumper switch 38 controlling valve 46 (FIGS. 6a to 6f) and thus the starting or stopping of the flow of liquid to spray nozzles 26. As apparatus 2 approaches object 40 which is received between arms 24 (FIG. 6a), contact with bumper plate 34 takes place (FIG. 6b) causing this plate to pivot and actuate switch 38, which in turn activates valve 46 to commence the flow of liquid through spray nozzles 26 at the ends of arms 24 and 42. As boom member 10 breaks away rearwardly (FIG. 6c) spray head 18 is rotated as illustrated and follows the surface of object 40 in the horizontal direction, causing the spray pattern as illustrated. Object 40 causes spray head 18 to rotate as illustrated in FIGS. 6c through 6e, until, at FIG. 6e, contact between object 40 and bumper plate 34 is terminated, permitting plate 34 to return to its starting position and causing bumper switch 38 to deactivate valve 46, terminating the spraying of liquid through spray nozzles 26. As the apparatus continues in the forward direction, boom member 10 and spray head 18 clear object 40 and boom member 10 returns to its starting, aligned position with respect to member 8. An appropriate drive means (not illustrated) may be used to return spray head 10 to the start position of FIG. 6a.

The device according to the present invention thus permits the spraying by tractor of rows of objects such as trees or poles, having circular cross-sectional bases, completely about the circumference of their bases in a single run of the tractor along such line of objects. While the apparatus has particular application for herbicidal spraying of orchards, it is envisaged that it would similarly be suitable for herbicidal spraying of the bases of telephone poles, fire hydrants and the like.

Thus it is apparent that there has been provided in accordance with the invention an apparatus to spray liquid completely around immoveable upstanding objects such as trees or poles that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. An apparatus to be borne by a tractor, truck or like vehicle, for spraying liquid completely around immoveable upstanding objects, such as trees or poles, having generally circular cross-section, comprising:
   (a) an articulated boom comprising an inner and outer, normally aligned, linear members secured, the inner member to be secured to the tractor to extend outwardly from a side thereof, these members being secured to each other at one end so that, during operation, the outer member can pivot about a vertical axis out of alignment with respect to the inner member, in a direction opposite to the direction of motion of the tractor, in a horizontal plane;
   (b) biasing means urging the outer member back to aligned position when it pivots out of alignment;
   (c) a spray head rotatably secured to the free end of the outer member to rotate about a vertical axis at the center of the head, the head having a plurality of arms radially and outwardly extending from its center, adjacent arms forming angles of 90° or more with respect to each other, the arms to receive between adjacent pairs a portion of the immoveable object;
   (d) a spray nozzle at the end of each of the arms;
   (e) pipe means to carry liquid to be sprayed to the spray nozzle;
   in operation the boom to be moved so that said portion of the immoveable object is received between the arms of the spray head, as the apparatus is moved in one direction to one side of the object, causing the outer boom member to pivot rearwardly and draw the spray head by the object in close proximity thereto, and also causing the spray head to rotate in such a manner that spray from the spray nozzles covers the ground all around the base of the object;
   (f) cam means between adjacent arms against which the portion of the object received between the arms is to bear and cause the spray head to rotate as the boom is moved past the object on the one side thereof.

2. An apparatus according to claim 1 wherein the spray head has arms of a length normally greater than the diameter of the immoveable object, the base of which is to be sprayed.

3. An apparatus according to claim 2 wherein the spray head has four arms of similar length, each positioned at a 90° angle with respect to adjacent arms at either side.

4. An apparatus according to claim 1 wherein the spray head comprises three arms, two to receive a portion of the immoveable object being positioned at a 90° angle with respect to each other, and the other being positioned at a 135° angle with respect to these other two arms.

5. An apparatus according to claim 4 wherein the two arms positioned at a 90° angle to each other are of a length normally greater than the diameter of the immoveable object, the base of which is to be sprayed, and wherein the other arm is shorter whereby a generally circular pattern of spray circumscribing the base of the immoveable object is obtained during operation of the device.

6. An apparatus according to claim 1 or 4 wherein the cam means comprises a curved plate extending between adjacent pairs of arms near their inner ends, the plate being pivotably secured to one of the arms, and a switch means operatively positioned behind the plate and associated with a control means on the pipe means so that when the plate is pivoted from starting position as the immoveable object come into contact with it, during operation of the device, the switch means is actuated to cause the control means to commence flow of spray from the spray nozzles, and when the immoveable object ceases being in contact with the plate, the plate returns to starting position deactuating the switch means to cause the control means to terminate flow of spray.

7. An apparatus according to claim 1 wherein the spray head is provided with detachment means to permit its detachment from the boom member to which it is normally rotatably secured.

8. An apparatus according to claim 1 wherein the spray nozzles are pivotably secured to the arms of the spray head for directional adjustment about a horizontal axis.

* * * * *